Figure 1:
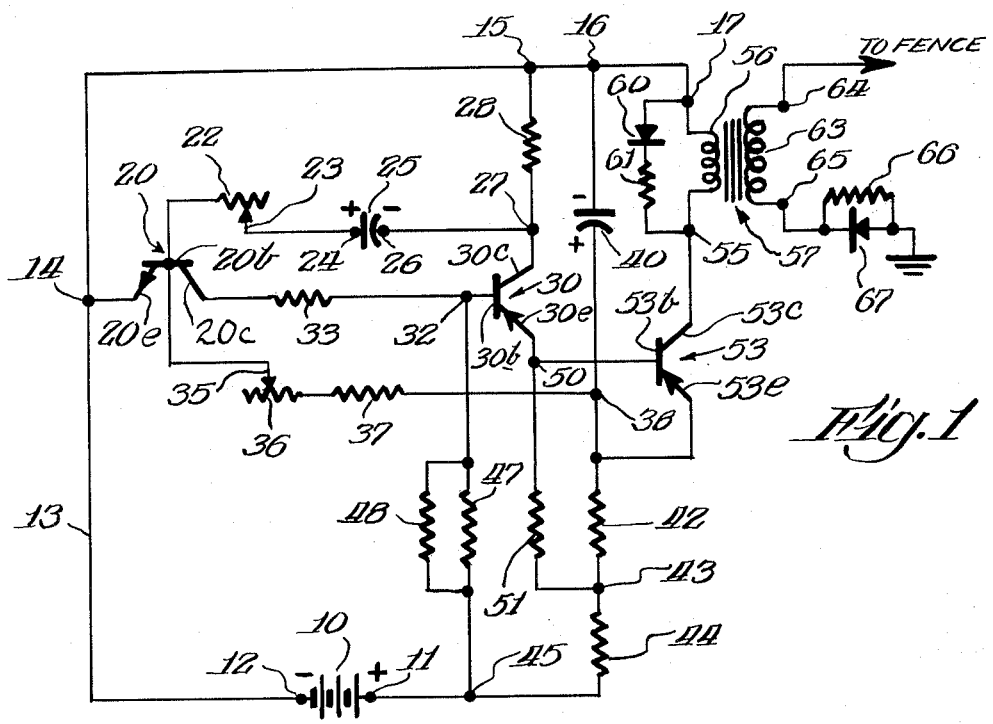

Dec. 24, 1963  R. F. BEGUIN  3,115,610
TRANSISTOR RELAXATION OSCILLATOR FENCE CHARGER
Filed July 19, 1962

Inventor:
Richard Beguin
BY Robert L. Kahn
ATTY.

United States Patent Office 3,115,610
Patented Dec. 24, 1963

3,115,610
TRANSISTOR RELAXATION OSCILLATOR
FENCE CHARGER
Richard F. Beguin, Evanston, Ill., assignor to Electronic Specialties Co., Batavia, Ill., a corporation of Illinois
Filed July 19, 1962, Ser. No. 211,074
6 Claims. (Cl. 331—71)

This invention relates to an electric fence charger, and more particularly to a transistorized fence charger having simple circuits and having reliable and efficient operating characteristics.

Fence chargers operate under temperature and load conditions which are quite severe, particularly in regard to their effects on transistors. Insofar as transistor characteristics are concerned, it is well known that the characteristics of transistors vary quite substantially over the ranges of temperature which may be encountered by fence chargers. In many instances, fence chargers are exposed to temperatures ranging from minus 25° F. (or even lower) to over 100° F., and even higher if the mechanism is in a housing directly exposed to sun. This temperature range is sufficiently great to affect seriously the operating characteristics of a transistor. In addition, capacitors used in such chargers are generally of the electrolytic type and reduce their capacitance with a drop in temperature. Since most transistorized fence chargers rely upon RC (resistor-capacitor) circuits, it is clear that a poorly designed fence charger will vary its repetition rate substantially with change in temperature. This is highly undesirable. For one thing, a battery operated fence charger will have a different current drain with different temperatures. Consequently, a fence charger which may be left in the field may become inoperative due to battery failure.

Another reason why a variation in the repetition rate is undesirable relates to the efficiency of the step-up transformer. Any decided change in the duration of an On time period may prevent a transformer from developing a desired high potential or may result in a waste of current through the transformer.

A desired characteristic of a transistorized fence charger is a sharp closing or opening, or both, of the current supply circuit to the primary of the high potential step-up transformer. The sharper the switch action, the more effective will be the transformer action.

Many prior fence chargers have transistor circuits having objectionable switching and temperature characteristics.

An additional factor in the operation of a fence charger resides in the fact that the load in the fence charging circuit may vary from a very high resistance, in the megohm range, down to practically zero resistance when the fence to be charged is exposed to wet weather. Unless means are provided for controlling the minimum resistance of the load, a great increase in current for the transformer will be required when the load resistance is practically zero. This will have undesirable effects in the operation of the system, and, in the case of a battery powered fence charger, there will be an additional drain on the battery which will curtail its life.

This invention provides a transistorized fence charger which has highly desirable operating characteristics, has stability over wide ranges of temperature and over side ranges of output load. A desirable feature of a system embodying the present invention resides in the fact that no precision components are required.

Figure 2:
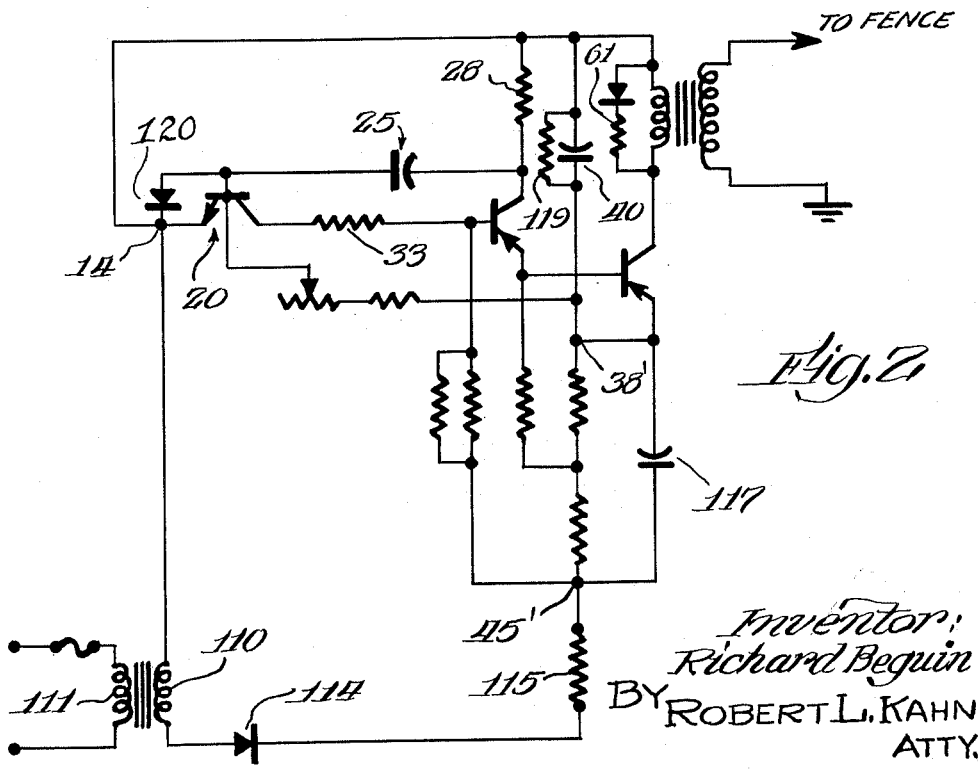

In order that the invention may be disclosed both generally and specifically, reference will now be made to the drawings wherein:

FIGURE 1 shows a circuit diagram of one form of fence charger embodying the invention; and FIGURE 2 shows a modification.

Referring first to FIGURE 1, battery 10 has positive terminal 11 and negative terminal 12. For convenience, positive terminal 11 may be considered as ground. Negative terminal 12 is connected by wire 13 to junction points 14, 15, 16 and 17. Punction point 14 is connected to emitter electrode 20e of NPN transistor 20. Transistor 20 has its base electrode 20b connected to one terminal of variable resistor 22. Variable resistor 22 includes wiper 23 which is connected to terminal 24 of capacitor 25. Capacitor 25 has its remaining terminal 26 connected to junction point 27. Between junction points 15 and 27 is resistor 28. Junction point 27 is connected to collector electrode 30c of PNP transistor 30. Transistor 30 has its base 30b connected through junction point 32 and resistor 33 to collector electrode 20c. Base 20b of transistor 20 is also connected to movable contact 35 cooperating with resistor 36. Resistor 36 is connected through thermistor resistor 37 to junction point 38. Between junction points 38 and 16, there is connected capacitor 40. Junction point 38 is also connected through resistor 42 to junction point 43 which in turn is connected through resistor 44 to junction point 45 and thence to positive terminal 11 of the battery.

From junction point 45, a branch circuit goes toward junction point 32 and this contains resistor 47 and thermistor 48 connected in shunt.

Referring to transistor 30, this has emitter 30e connected to junction point 50. Junction point 50 is connected to one terminal of resistor 51, the remaining terminal of this resistor being connected to junction point 33. Junction point 50 is also connected to base 53b of PNP transistor 53. This transistor 53 has its emitter 53e connected to junction point 38. Transistor 53 has its collector electrods 53c connected to junction point 55. Between junction points 17 and 55 there is connected primary winding 56 of high potential step-up transformer 57. Shunted across transformer winding 56 are rectifier 60 and resistor 61, these two being in series. Transformer 57 has secondary 63 in which high potentials of the order of 5,000 or 10,000 volts may be generated. Transformer 57 is of the type used in fence chargers and has substantial leakage reactance. Top terminal 64 of the secondary is the high potential terminal which will be connected to a fence to be charged. The remaining terminal 65 of the secondary is connected to ground through resistor 66 shunted by rectifier 67.

Transistor 20 is of the NPN type, in which case transistors 30 and 53 will be of the PNP type. Capacitors 25 and 40 must be connected, if they are polarized, to have the polarities indicated. Rectifiers 60 and 67 are poled so that current flows in the direction of the arrow-head, this showing being in accordance with convention. It is understood that insofar as the flow of electrons is concerned, the direction will be against the arrow-heads indicated by the rectifiers, this also being understood.

Transistor 20 need not handle any substantial power insofar as current is concerned. Transistor 30, however, is a driver transistor and may have to handle as much as 4 or 5 amperes. Transistor 53 is a heavy duty transistor and should be capable of handling currents of the order of 25 or 30 amperes and withstanding back potentials of the order of about 80 volts. It is understood that the above details are exemplary for a specific system wherein a 6-volt battery is used and wherein the components have the values to be hereinafter designated.

As an example of a system for use with a 6-volt dry battery, the various components may be as follows:

Transistors:
20 NPN _____ 2N1304
30 PNP _____ 2N378
53 PNP _____ 2N174

Capacitors: Microfarads
25 _____ 50
40 _____ 15,000

Resistors: Ohms
22 _____ 5
28 _____ 1.2
33 _____ 27
35 _____ 50,000
42 _____ 10
44 _____ 10
47 _____ 680
51 _____ 22
61 _____ 22
66 _____ 22,000

Thermistors:
 37 RL2006–2930–120–K9.
 48 RL11F1–K1.
(Made by Keystone Carbon Co. of St. Marys, Pa.)

Rectifiers:
 60 any type good against 100 volts.
 67 F6 (made by Sarkes Tarzian, Inc.).

The above system will have an On time of about two milliseconds (during which time, current will flow through transformer primary 56) and an Off time of about 998 milliseconds. It is understood that the above time figures are approximate and it is also understood that the values of the various components in the example can vary over the usual commercial tolerances of about 25%.

The operation of the system is as follows.

Capacitor 40 normally charges during Off periods (which is most of the time) almost to the full potential existing across battery 10. During the short interval comprising On time the voltage across capacitor 40 drops to between about zero volts and about three or four volts. The variation in the lower limit of the potential across capacitor 40 will generally be determined by such factors as the excellence of capacitor 40, the ambient temperature of capacitor 40 and the variation generally of the On time part of an operating cycle. If capacitor 40 is of excellent quality whose value remains substantially constant in spite of temperature changes, a lower value than 15,000 mfd. can be used and the entire system can be designed so that the potential across capacitor 40 will drop to a minimum predetermined value. It is therefore to be understood that permitting capacitor 40 to discharge only partly during On time provides a safety factor.

With respect to capacitor 25, in the system illustrated, this capacitor will charge fast during On time and will discharge slowly during Off time. Capacitor 25 will be charged to less than six volts across its terminal (in the system given it will charge to about two volts), and during discharge, the voltage across the same will drop gradually to zero. During On time, transistors 20, 30 and 53 conduct and during Off time the three transistors are cut off. The cut-off of the transistors is maintained during Off time by virtue of the back bias on transistors 30 and 53. The functions of thermistors 37 and 48 are to compensate for the variation of operating characteristics of the transistors over a wide range of ambient temperatures. Variable resistor 22 can be adjusted to control the On time period, while variable resistor 36 can be adjusted to change the repetition rate.

During On time, capacitor 25 is charged through the following circuit: battery terminal 11, resistors 44 and 42, junction point 38, resistors 37 and 36, the wire going from wiper 35 through base 20b of transistor 20 to resistor 22, terminal 24 of capacitor 25, terminal 26, junction point 27, resistor 28, junction point 15, junction point 14, wire 13, to terminal 12 of the battery.

The initial rush of current through capacitor 25 produces a drop through resistor 28. This results in the base of transistor 20 becoming positive to emitter 20e. As a result, transistor 20 conducts and permits additional charging current to flow from battery terminal 11 through junction point 45, parallel resistors 47 and 48, junction point 32, resistor 33, collector 20c, base 20b, then through the remainder of the charging circuit of capacitor 25 as before.

When transistor 20 conducts, the IR drop across resistor 33 causes the potential of junction point 32 to drop. This causes transistor 30 to conduct. Thus current will flow from battery terminal 11 through resistor 44 to junction point 43, resistor 51, junction point 50, emitter 30e, collector 30c to junction point 27 and thence to the remainder of the circuit back to terminal 12. When transistor 30 conducts, the potential of junction point 50 drops and causes transistor 53 to conduct. When transistor 53 conducts, it permits capacitor 40 to discharge with current going through emitter 53e, collector 53c, transformer primary 56, junction point 16, to the top terminal of capacitor 40. Diode 60 prevents the capacitor from discharging through the branch circuit.

A trace of the voltage between the emitter and base of transistor 20 will show a sudden jump at the beginning of a cycle from zero to about two volts with the voltage dropping down to about zero during two milliseconds when the transistor is conducting. The voltage then suddenly drops to about two volts below zero during cut-off (polarity reversed) and gradually rises for the balance of the cycle to zero. During the time that transistor 20 conducts, the voltage between the emitter and collector, which is normally about five volts, quickly drops to zero and stays that way until cut-off, at which time the voltage jumps to its normal value. The voltage between the base and collector, which is also normally about five volts, drops when the transistor cuts in to below zero and rises somewhat during conduction but still maintains the reverse polarity. When the transistor cuts out, the voltage quickly rises to the maximum value of six volts and tapers down to a lesser value for the balance of the cycle.

With reference to transistor 30, the potential between the emitter and base is zero at the beginning of a cycle and when this transistor cuts in, the voltage jumps to one volt and gradually drops to about a half a volt during conduction. When the transistor cuts out, the voltage drops fast to about one volt below zero and gradually rises to zero for the balance of the cycle. The potentials between the emitter and collector and the base and collector are quite similar in appearance. Between the emitter and collector, the normal voltage is about five volts and during conduction drops to zero, and when the transistor cuts out, the voltage rises quickly to about four volts and then gradually for the balance of the cycle to the full five volts. The corresponding curve for the base and collector voltages has as the normal voltage a little over five volts, with the voltage dropping to zero when the transistor conducts and jumping to about five volts when the transistor cuts out. The voltage gradually rises from five volts to its final value for the balance of the cycle.

Referring to transistor 53, the voltage between emitter and base is normally about minus a half a volt. Then this transistor cuts in, the voltage jumps to about one volt and drops somewhat during conduction. When transistor 53 cuts off, the voltage quickly drops to about minus one volt and for the balance of the cycle gradually rises to about minus one-half volt.

Still referring to transistor 53, the voltage between the emitter and collector is normally zero except for a short instant of time after the transistor cuts off. At this time, a sharp voltage spike which quickly rises from zero to about 70 or 75 volts and which quickly drops almost to zero indicates the sharp potential peak due to the self-inductance of the transformer. The voltage between emitter and collector shows the same shape.

While transistor 20 cuts in first, the action on the other transistors is so fast that for practical purposes the three cut in (and out) at about the same time. Actually 20 cuts in first, followed by 30, then by 53. The same sequence occurs on cut-out. The time difference between one transistor acting and another following is in the microsecond range. For the time intervals concerned here, the three act practically simultaneously.

The On time discharge of capacitor 40 through primary 56 is so adjusted with reference to the transformer as a whole, that the current in primary 56 can rise to a desired value. Assuming for the moment that transistors are cut off, the decay of the magnetic field in the transformer core induces a reverse potential in primary 56 and this reverse potential causes current to flow through diode 60 and resistor 61. Resistor 61 has a sufficiently low value so that the field in the transformer collapses very quickly and generates a very high potential in secondary 63. The arrangement of resistor 66 and diode 67 is such that even if the fence is shorted, the transformer has a minimum load represented by resistor 66 insofar as the potential generated in transformer secondary 63 is concerned. Diode 67 is poled so that during On time when current is raising in primary 56, the induced potential in secondary 63 is blocked by the diode and current must flow through resistor 66. Thus the current drain is stabilized. Insofar as the high voltage spike is concerned, generated in secondary 63 upon collapse of the field, it is immaterial what the resistance of the load circuit is, since capacitor 40 is isolated from its load and current drain is no factor.

During On time when capacitor 25 is charging, the flow of current through capacitor 25 and resistor 28 rises from zero at the beginning of On time steeply to a maximum during On time part of the cycle and drops fast during the very last part of the On time cycle. This drop-off in the current is due to the fact that as capacitor 25 charges, the current through resistor 28 begins to drop and tends to reduce the bias on transistor 20 for conduction.

As capacitor 25 becomes charged, transistor 20 tends toward cut-off, since the potential of junction point 27 begins to approach the potential of junction point 15. Thus the base of transistor 20 becomes less positive to emitter electrode 20e and causes transistor 20 to cut off. The cut-off of transistor 20 causes the potential of junction point 32 to rise with reference to battery terminal 11 and starts a cut-off operation on transistor 30. Once the trend toward cut-off in transistor 30 is initiated, it continues until transistor 30 cuts off. The same cut-off tendency exists for transistor 53 at this time, with the potential at junction point 50 rising as transistor 30 cuts off. The back voltage on collector electrode 53c during cut-off may go up to as high as 75 or more volts as the result of the self-induced E.M.F. in primary winding 56.

Instead of a 6-volt battery, a higher voltage battery such as 12 volts may be used, assuming of course, that the transistors can stand the back voltages. Some rearrangement of the values of certain resistors may be necessary to adjust bias potentials. However, in general, the higher the voltage available at terminals 11 and 12, the more efficient the system will be, due to the fact that the various drops through the transistors will have less influence on the system. In addition, the charging of the various capacitors will occur at steeper rates.

Resistors 42 and 44 may, if desired, be replaced by diodes properly poled to conduct current from battery 11 toward terminal 38. For low voltages, resistors are preferred. It is understood throughout that the electron flow is actually the reverse of assumed current flow, the assumed current flow simply adhering to an old symbolism. If a 12-volt battery is used instead of a 6-volt, resistors 28 and 33 would have to be changed to control the current going through transistors 20 and 30. There might also be some change in the repetition rate which could be adjusted by varying other resistors.

The function of resistor 47 is to linearize the characteristics of thermistor 48. In the system as described above, thermistor 37 can have a resistance of about 5,000 ohms at about 75° F. and go up to about 75,000 ohms at, say, minus 20° F. Thermistor 48 can have a resistance of about 2,000 ohms at about 75° F. and might drop to about 500 ohms at, say, about 120° F.

The above values for the thermistors, particularly the values at other than 75° F. are approximate and can be quite different depending upon the degree of stabilization desired. Insofar as transistors 30 and 53 are concerned, the back bias on these transistors is provided by the IR drops across resistors 42, 44 and 51. There will be drops across these resistors except during the short interval when capacitor 40 is fully charged. The time constant of the charging circuit containing capacitor 40 is preferably so adjusted that capacitor 40 becomes fully charged just when the On time part of the cycle occurs. In other words, capacitor 40 charges slowly during the Off time and when the system is properly adjusted, capacitor 40 will be almost discharged just after it becomes fully charged.

By virtue of this relationship there will be minimum current leakage through the transistors except when the transistors are supposed to be On or conducting. Under some conditions, when capacitor 25 discharges, there may be a slight reversal of polarity of capacitor 25, it being charged in the reverse direction (terminal 26 being positive to terminal 24), with the potential across the capacitor being very low in comparison to the 6 volts. This will occur when transistor 30 is conducting heavily, so that the potential of junction point 27 will be somewhat positive to the potential of junction point 15 as the result of the IR drop across resistor 28. This may occur just prior to the onset of the On time and may be due to the fact that the back bias of transistors 30 and 53 and the charging time for capacitor 40 are not exactly perfect with respect to the duration of the Off time.

Referring now to FIGURE 2, there is illustrated a fence charging system generally similar to the system illustrated in FIGURE 1 but adapted for energization from an alternating current power line. Instead of battery 10, there is provided secondary winding 110 energized by primary winding 111 from a conventional power line such as about 117 volts at 60 cycles. Transformer 112 is a conventioinal iron core transformer for this type of work. Secondary winding 110 has one terminal connecting to junction 14 of the system and has the other terminal of the secondary winding connected through rectifier 114 to one terminal of resistor 115. Resistor 115 has its other terminal connected to junction point 45'. The remainder of the system is the same as in FIGURE 1 with the following changes.

Across junction point 45' and 38' there is connected filter capacitor 117. Across capacitor 40 in FIGURE 2 is connected filter resistor 119. It will be noted that resistor 22 in FIGURE 1 has been omitted in FIGURE 2. It may be included if desired. It should also be noted that load resistor 66 and rectifier 67 in the high potential output circuit in FIGURE 1 has also been omitted in FIGURE 2.

In the example previously given of a system embodying FIGURE 1, the same values and components may be used in FIGURE 2 with the following exceptions. Resistor 33 in FIGURE 2 preferably has a higher value of about 67 ohms and resistor 28 in FIGURE 2 also has a higher value, preferably about 2.7 ohms. Resistor 61 across the primary winding of the high potential output transformer preferably has a lower value in FIGURE 2 and can be about .5 ohm. Resistor 119 in FIGURE 2 has a fairly high value and can be about 330 ohms, while capacitor 117 has a value of about 200 mfd. Capacitor 40 can be about 5,000 mfd. Resistor 115 can have a value of about 33 ohms. Such a system will have the On-Off times generally about equal to the system illustrated in FIGURE 1. In both FIGURES 1 and 2, diode 60 can be omitted, in which case resistor 61 should have a higher value. In both figures, transistor 20 has a certain leakage current permitting capacitor 25 to discharge after cut-off.

In this modification, diode 120 can be connected across the base and emitter of transistor 20, the diode being poled to permit current in that direction. In the system given, a 100-volt diode will be adequate and functions to speed conduction of the transistor. This diode can be omitted.

What is claimed is:

1. A transistorized fence charger comprising a source of current having positive and negative terminals respectively, a first circuit including resistance networks going from the positive terminal to the base of a first transistor and continuing from said base to one terminal of a capacitor with the circuit continuing from the other terminal of the capacitor through a resistor to the negative terminal, a second resistor network extending from a point on said resistor network to the base electrode of a second transistor and continuing through a resistor to the collector of the first transistor, a connection between the emitter of the first transistor and the negative terminal, a connection from the collector of the second transistor to the other terminal of said first capacitor, a connection including a resistor between the emitter of the second transistor and a point on said first resistor network, a connection between the emitter of said second transistor and the base of a third transistor, a connection between the emitter of said third transistor and a point on said first named resistor network, a second capacitor connected between the negative terminal and emitter of the third transistor, a transformer having a primary winding connected between the collector of the third transistor and the negative terminal, a resistor connected across said winding to permit current due to self induced potential in said primary winding resulting from cutting off the energizing current for said winding to flow, said transformer having a secondary having one terminal connected to ground and the other terminal for impressing a high potential on a fence, said first transistor being of the NPN type and the remaining two transistors being of the PNP type, said system being so designed that said first capacitor charges to determine an On time, said three transistors normally conducting during said On time, said circuit having the resistors and networks arranged so that when said first capacitor is charging, said first transistor becomes conducting and when the first capacitor is charged, said first transistor cuts off, the resistor networks providing for the first transistor to control the second transistor and the second transistor controls the third transistor so that the three transistors conduct or cut off substantially together, said first capacitor tending to discharge during an Off period, said second capacitor charging during the Off period and discharging during the On period, said second capacitor discharging through the emitter and collector of the third transistor to provide energizing current for the primary winding of said transformer, said various resistors having suitable values so that the On time duration is short enough so that said second capacitor discharges to supply energizing current during the On time with the third transistor cutting off the flow of energizing current before said second capacitor is fully discharged whereby the sudden interruption of energizing current permits a sharp potential peak to be generated in the secondary winding.

2. The system according to claim 1 wherein the first and second named resistance networks each contain a thermistor for stabilizing the operation of the system.

3. The system according to claim 2 wherein the transformer secondary winding has a rectifier shunted by resistor in circuit, said rectifier being so poled as to prevent the flow of current therethrough while energizing current in the primary winding is increasing.

4. The system according to claim 2 wherein a rectifier is in series with the resistor across the primary winding of said transformer, said rectifier being poled to permit self-induced current to flow only after the energizing current is cut off.

5. The system according to claim 2 wherein a power supply including a transformer to be energized from a power line has a secondary winding with a rectifier for providing current to said positive and negative terminals.

6. The construction according to claim 5 wherein said resistance networks include a resistor common to all networks.

No references cited.